United States Patent [19]
Offringa et al.

[11] Patent Number: 6,104,115
[45] Date of Patent: Aug. 15, 2000

[54] METHOD FOR FABRICATING A PERMANENT MAGNET ROTOR, AND ROTOR OBTAINED BY SAID METHOD

[75] Inventors: Lodewijk J. J. Offringa, Eindhoven; Franciscus J. M. Thoolen, Horn, both of Netherlands

[73] Assignee: Technische Universiteit Eindhoven, Eindhoven, Netherlands

[21] Appl. No.: 09/420,862

[22] Filed: Oct. 19, 1999

[30] Foreign Application Priority Data

Oct. 21, 1998 [EP] European Pat. Off. ............... 98203543

[51] Int. Cl.[7] .......................... H02K 21/12; H02K 21/14; H02K 15/03
[52] U.S. Cl. ................. 310/156; 310/42; 29/598
[58] Field of Search ................ 310/42, 45, 156; 29/598

[56] References Cited

U.S. PATENT DOCUMENTS

| | | | |
|---|---|---|---|
| 3,573,812 | 4/1971 | Pihl | 335/125 |
| 4,049,475 | 9/1977 | Houska | 148/101 |
| 4,117,360 | 9/1978 | Richter | 310/156 |
| 4,629,920 | 12/1986 | Hermann | 310/156 |
| 4,942,322 | 7/1990 | Raybould et al. | 30/156 |
| 5,005,757 | 4/1991 | Kornely, Jr. et al. | 29/609 |
| 5,486,730 | 1/1996 | Ludwit et al. | 310/156 |
| 5,706,573 | 1/1998 | Lee | 29/603.03 |
| 5,801,470 | 9/1998 | Johnson et al. | 310/156 |

FOREIGN PATENT DOCUMENTS

| | | |
|---|---|---|
| 0 013 157 | 7/1980 | European Pat. Off. . |
| 0 043 981 | 2/1982 | European Pat. Off. . |
| 32 24 904 | 1/1984 | Germany . |
| 0 219 688 | 4/1987 | Germany . |

*Primary Examiner*—Clayton LaBalle
*Attorney, Agent, or Firm*—Stroock & Stroock & Lavan LLP

[57] ABSTRACT

In a method for fabricating a permanent magnet rotor for an electrical machine, a rotor support having an axis of rotation is provided. At least two poles are provided on the rotor support, each pole having at least one permanent magnet. A screen made essentially from a highly conducting material is provided on the surface of the permanent magnets facing a stator of the electrical machine. The screen is applied galvanically. On the screen an annular fiber reinforced support is fitted. The rotor support comprises two partially conical parts interacting with each other to prestress the rotor radially.

19 Claims, 3 Drawing Sheets

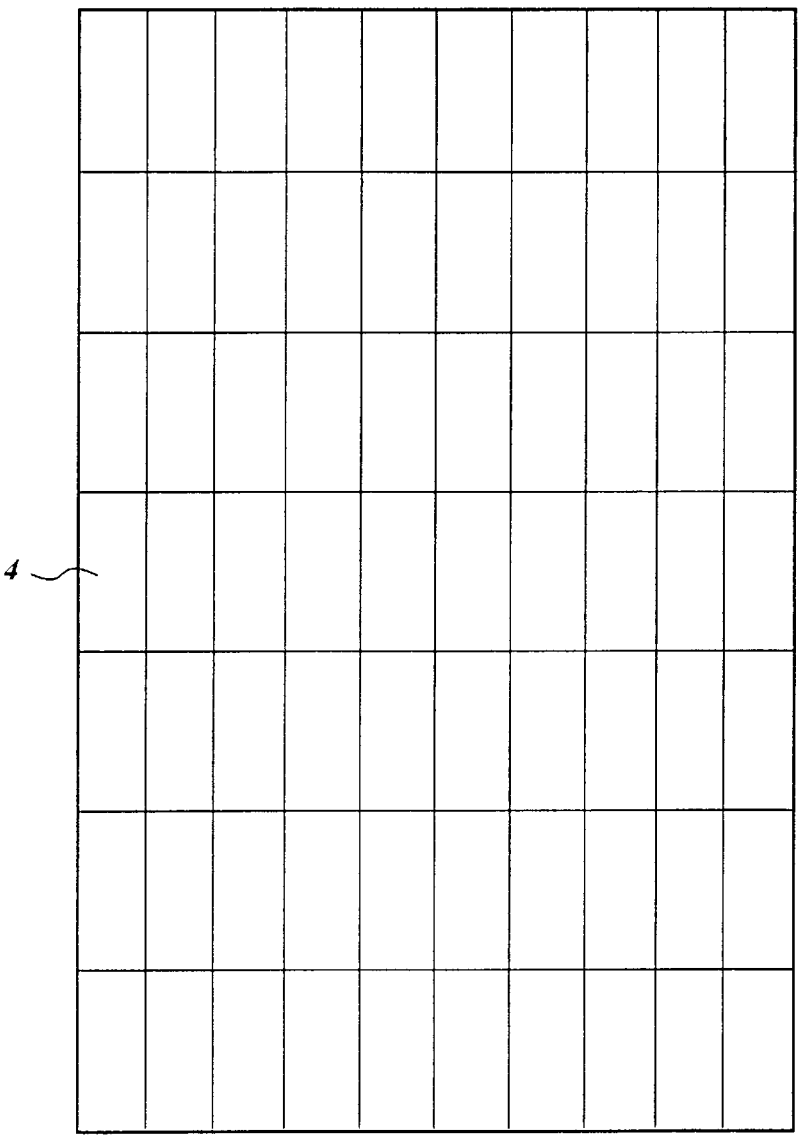
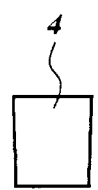
Fig. 3
Fig. 2
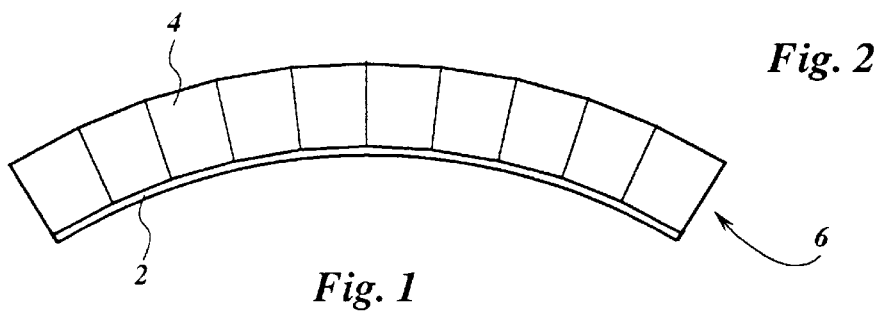
Fig. 1

METHOD FOR FABRICATING A PERMANENT MAGNET ROTOR, AND ROTOR OBTAINED BY SAID METHOD

BACKGROUND OF THE INVENTION

This invention relates to a method for fabricating a permanent magnet rotor for an electrical machine, the method comprising the steps of: providing a rotor support having an axis of rotation; providing at least two poles on the support, each pole comprising at least one permanent magnet; and providing a screen made essentially from a highly conducting material on the surface of the permanent magnets which is adapted to be facing a stator of the electrical machine. The invention also relates to a rotor obtained by said method.

DISCUSSION OF THE PRIOR ART

Permanent magnet rotors of the above-mentioned type are known from e.g. European Patent Application No. 43,981. This publication describes a rotatable support on which permanent magnets forming the poles of the rotor are mounted. With increasing dimensions of the rotor and consequently increasing pole surfaces, each pole is made up of a plurality of smaller magnets. Such smaller magnets can be handled and magnetised relatively easily, and are relatively cheap. Additionally, the eddy currents which are generated at the pole surfaces facing the stator as a result of the harmonic magnetic fields when the rotor is in operation, can be kept low by assembling a pole from a plurality of magnets, preferably electrically insulated from each other, thus keeping the losses in the magnets and the pole as a whole low.

As a further means for reducing rotor losses, the permanent magnet poles of the rotor at the side facing a stator may be covered by a screen made of an electrically highly conducting material, such as copper. In the prior art, as exemplified in European Patent Application No. 13,157, such a screen consists of an annular plate which is slid over the permanent magnet poles of the rotor and fixed to the rotor. Such an arrangement suffers from a number of drawbacks.

As a first drawback, the annular plate usually is fabricated from a flat plate which is rolled to the desired diameter, and from which then two adjacent sides are welded together. The weld seam not only forms an electrical and mechanical inhomogeneity in the otherwise homogeneous screen, but also constitutes a weak part of the screen which may break when the hoop stresses in the screen attain high values. High hoop stresses may be generated during prestressing and assembling a rotor, such as disclosed in German Patent Application No. 3,224,904, and at high rotational speeds.

A second drawback is evident when the structure of the permanent magnet rotor poles is considered in more detail. In the present technical field, the hard and brittle material of the permanent magnet is usually ground in the shape of rectangle or a trapezium such that a number of magnets situated next to each other in the tangential direction of the rotor fit closely to each other. However, the outer surface of the rotor thus obtained is not exactly cilindrical, but forms a multi-plane approximation of a cilindrical shape. Consequently, the annular screen plate, when it is being put into place over the magnets, also will assume a more or less multi-planar shape, whereas any space remaining between the outer surfaces of the magnets and the surface of the screen facing the outer surfaces of the magnets must be filled with an appropriate material, such as a fiber or filler reinforced polymer material, such as a resin. During prestressing and assembling the rotor, such as disclosed in German Patent Application No. 3,224,904, and in operation, in particular at high rotational speeds, the polymer material is subjected to considerable compressive forces, and may be damaged thereby, resulting in a deterioration of the bond between the magnets and the screen. As a consequence thereof, a possible deterioration of the bond between the magnets and the support of the rotor may occur, resulting in loose magnets, imbalance in the rotor, and possible great and irreparable damage to the electrical machine.

In case the screen is enclosed by an annular support sleeve made from a fiber-reinforced polymer material, the fibers may be damaged at the bends of the multi-planar annular screen plate, which is highly undesirable.

Further, in the fabrication of a permanent magnet rotor, applying magnets to the rotor support and fixing them by bonding, problems are caused in that the magnets must be mounted one at a time, or in a limited number at a time. These magnets must be fixed on the support by special tools until the bonding agent has developed sufficient bonding strength, since all magnets being part of the same rotor pole have the same magnetic orientation, causing adjacent magnets to repel each other relatively strongly, especially with today's high-field-strength magnets. Placing the magnets on the rotor pole support thus causes considerable difficulties which increase when the magnetic field generated by the magnets increases. Moreover, this method of applying the magnets is labour-intensive and time-consuming.

SUMMARY OF THE INVENTION

It is an object of the invention to eliminate the above drawbacks, and to provide a permanent magnet rotor with a screen which obviates the risks of loose magnets and damage to the rotor, in particular at high rotational speeds.

According to the invention, this object is attained by applying the screen on the rotor magnets galvanically. Thus, any or at least most of the plastic bonding between the magnets and the screen is eliminated, and the magnets are essentially directly mechanically supported by the screen. The screen is electrically and mechanically homogeneous, a weld seam being absent. The material of the screen is quite pure, resulting in a high conductivity and a very effective screening effect. When galvanically applying the screen on a multi-planar outer surface of the permanent magnets (after initially coating the outer surfaces of the magnets with an electrically conducting film), it appears that the screen material is deposited evenly on the multi-planar surface, and covers or fills each irregularity in the surface until a radial thickness of the screen is obtained which roughly approximates a cilindrical shape. Subsequently, a machining operation will make the surface of the screen facing away from the magnets cilindrical to the desired extent.

The method according to the invention can be used for the fabrication of an electrical machine with a rotor with outer poles—the stator enclosing the rotor—as well as for the fabrication of an electrical machine with a rotor with inner poles, enclosing the stator.

In a preferred embodiment of the method according to the invention, at each axial end of the poles a ring made essentially from a highly conducting material is fitted before providing the screen.

Such rings are known per se from European Patent Application No. 13,157, and provide an additional screening effect for the magnets. When the rings have been fitted, and subsequently the screen is applied galvanically, in the galvanizing process each ring can be made to be part of the screen, or at least be electrically connected to the screen, thus ensuring an optimum screening effect.

In the case of a rotor which is to be enclosed by a stator, for the rotor being able to withstand a radial prestressing and high rotational speeds it will be necessary to support the rotor construction by an annular support or supporting sleeve capable of withstanding high hoop stresses. Such an annular support may consist of a fiber reinforced polymer sleeve, the fibers preferably being carbon fibers. Since the outer surface of the screen according to the invention is not multi-planar as in the prior art but cylindrical, and is directly supported by the magnets, the annular support is only tensioned in the tangential direction, and is not bent in this direction thus eliminating unwanted local stress areas. Preferably, the annular support is made separately from the remainder of the rotor, and is subsequently put over the screen. It is, however, also possible to wind fibers in a polymer matrix directly on the outer surface of the screen.

In a preferred embodiment, the integrity of the rotor is ensured by fabricating the rotor support such that it comprises an inner rotor support part with a conical outer surface, and an essentially ring-shaped outer rotor support part with a conical inner surface, the conicity of the inner rotor support part and the outer rotor support part being complementary to each other, such that a predetermined radial stress pattern in the rotor is achieved at a predetermined axial position of the inner rotor support part relative to the outer rotor support part. The prestressing structure of the inner rotor support part and the outer rotor support part may cooperate with the annular support when the rotor has outer poles. It will be clear that the structure of the rotor support can be used in conjunction with, or independently from the galvanical application of the screen.

In order to simplify the assembly and handling of the rotor parts during the fabrication of the rotor, preferably each pole comprises at least one plate having at least two magnets mounted thereon. In a first step the magnets in an unmagnetized state are mounted on the plate. In a second step the magnets mounted (e.g. glued) on the plate are magnetized to become permanent magnets. In a third step the assembly of the permanent magnets and the plate is fitted, e.g. glued, to the support. The plate may be facing the support, in which case it will not be possible to remove the plate after mounting the permanent magnets on the support. However, the plate may also be facing away from the support, in which case it is possible in principle to remove the plate after mounting the permanent magnets on the support, if desired.

The claims and advantages will be more readily appreciated as the same becomes better understood by reference to the following detailed description and considered in connection with the accompanying drawings in which like reference symbols designate like parts.

BRIEF DESCRIPTION OF THE DRAWINGS

FIG. 1 shows a side view of a magnet pole assembly:

FIG. 2 shows a side view of a single magnet when viewed according to arrow II in FIG. 3;

FIG. 3 shows a top view of the magnet pole assembly according to FIG. 1;

DESCRIPTION OF THE PREFERRED EMBODIMENTS

FIGS. 1, 2 and 3 show a side of a curved thin rectangular plate 2 supporting on its convex surface an array of 70 blocks 4, hereinafter to be referred to as magnets 4. As FIGS. 1 and 2 clearly show, the magnets 4 are trapezium-shaped such that the row of abutting magnets 4 shown in FIG. 1 at its concave side conforms to the radius of the plate 2. The magnets 4 are bonded, e.g. glued, in unmagnetized state to the plate 2 and to each other. The assembly of the plate 2 and the magnets 4 bonded together constitutes an unmagnetized pole 6 or a part thereof of a rotor of an electrical machine.

Figure 4:
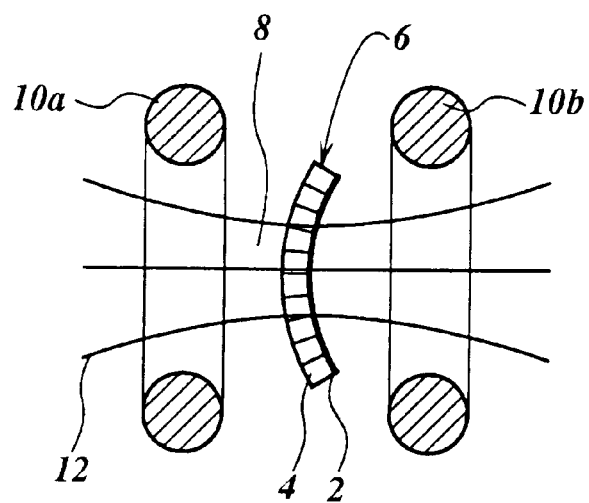
FIG. 4 serves to illustrate the magnetization of the magnet pole assembly.

FIG. 4 illustrates the principle of magnetizing the pole 6 by placing the pole 6 in an air gap 8 of two (possible more) air coils 10a, 10b which generate a magnetic field which is indicated by lines 12, by powering the coils 10a, 10b with a d.c. current. The value and the direction of the current are selected depending on the desired state of magnetization and direction thereof of the pole 6.

Figure 5:
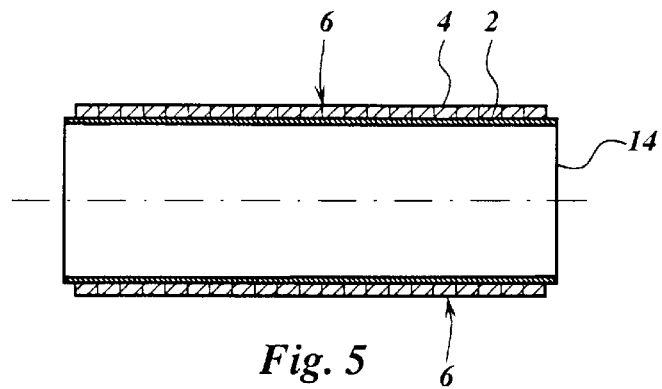
FIG. 5 illustrates on a reduced scale and in a cross-sectional view a number of permanent magnet pole assemblies mounted on a stretching sleeve.

As FIG. 5 illustrates, next a number of magnetized poles 6 are mounted on a sleeve 14. The outer diameter of the sleeve 14 is constant along its length, whereas the inner diameter of the sleeve 14 decreases from the lefthand side to the righthand side of FIG. 5: the inside of the sleeve 14 is conical.

Figure 6:
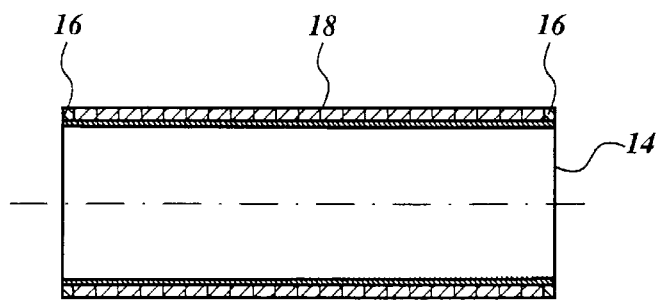
FIG. 6 illustrates mounting end rings on the assembly of the permanent magnet pole assemblies and the stretching sleeve, and applying a screen on the rotor.

As FIG. 6 illustrates, next at each end of the sleeve 14 a ring 16 made from an electrically highly conducting material, such as copper or aluminium or the like, is provided. Seen in the tangential direction, any gaps between the different poles 6 mounted on the sleeve 14 are filled with filling elements not shown in further detail, e.g. filling elements made of aluminium, or a polymer material containing a filler material.

In a next step, a screen 18 made essentially from an electrically highly conducting material is galvanically applied to the outer surfaces of the magnets 4 and the rings 16, i.e. the surfaces thereof facing away from the sleeve 14. The screen 18 is applied such that it is in electrical contact with the rings 16. For the purpose of galvanization, the rotor surface on which the screen 18 is to be formed, is made electrically conducting by removing any non-conducting or low-conducting layers, and/or by applying a conducting paint, such as a paint containing silver particles, on the surface. Any surface not to be galvanized is covered by a layer of isolating material. The rotor thus prepared is placed in a galvanizing bath and the screen is electrolytically formed on the conducting surface of the rotor.

Figure 7:
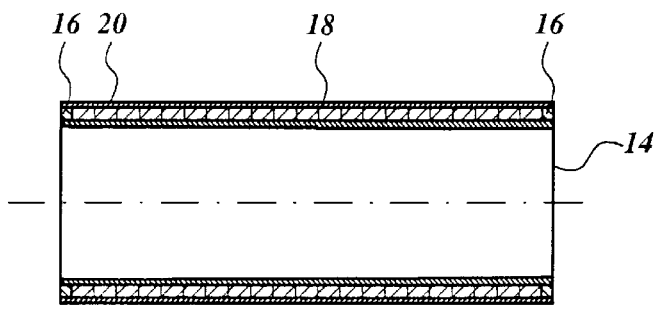
FIG. 7 illustrates a reinforcement sleeve mounted on the rotor screen.

As FIG. 7 illustrates, next a cylindrical supporting sleeve 20 is mounted on the screen 18. In preparation for the mounting of the supporting sleeve 20, it will generally be necessary to work the outer surface of the screen 18 to be cylindrical to the desired extent. Preferably, the supporting sleeve 20 30 is manufacatured separately from the rest of the assembly, and is slid over the assembly in the stage depicted in FIG. 7. The supporting sleeve 20 is manufactured from a fibre reinforced polymer material, such as a carbon fibre reinforced resin. Alternatively, the supporting sleeve 20 may be fabricated directly on the screen 18, e.g. by winding fibres wetted by a suitable polymer material directly on the screen 18.

Figure 8:
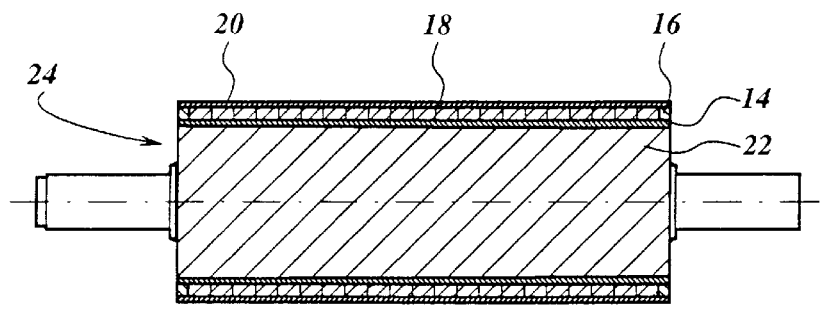
FIG. 8 illustrates in a partial cross-section a support provided in the stretching sleeve.

The assembly obtained according to FIG. 7 is then slid on an inner support 22, which has a diameter decreasing from the lefthand side to the righthand side of FIG. 8. The conical shape of the inside of the sleeve 14 has been made complementary to the conical shape of the outside of the support 22, resulting in a predetermined radial stress pattern in the rotor 24 thus obtained at a predetermined axial position of the sleeve 14 in the inner support 22. The use of the sleeve 14 in conjuction with the support 22 leads to an acceptable compressive stress in the region of the magnets.

The rotor 24 shown in FIG. 8 is particularly well suited for use in a very high speed permanent magnet motor and/or generator.

Figure 9:
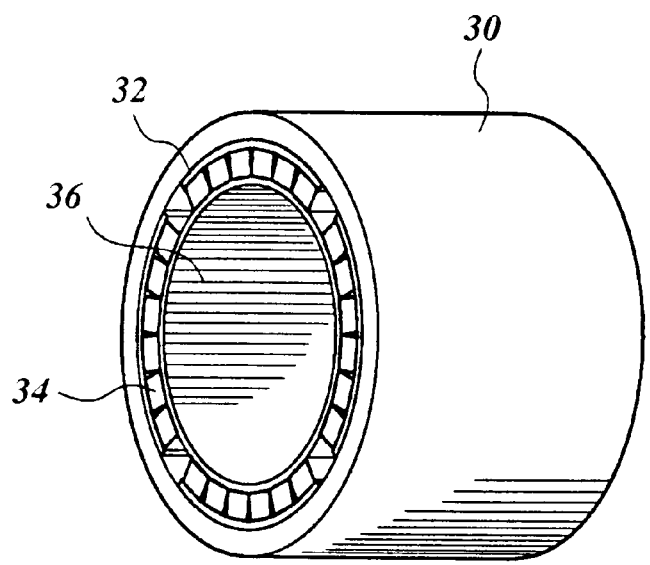
FIG. 9 shows a perspective view of another type of rotor according to the invention.

In the above the invention has been explained by reference to a rotor which is adapted to be enclosed by a stator. However, it is also possible to apply at least part of the invention to a rotor which is adapted to enclose a stator. An example of a part of such a rotor is shown in FIG. 9, having an annular cylindrical support 30, plates 32 on each of which an array of magnets 34 has been mounted, and a cylindrical screen 36 at the inner diameter of the rotor. Any space remaining between the poles of the rotor is filled with aluminium filling elements or a polymer material containing a filler material.

While the invention has been described and illustrated in its preferred embodiments, it should be understood that departures may be made therefrom within the scope of the invention, which is not limited to the details disclosed herein.

What is claimed is:

1. A method for fabricating a permanent magnet rotor for an electrical machine, the method comprising the steps of:
   providing a rotor support having an axis of rotation;
   providing at least two poles on said rotor support, each of said poles comprising at least one permanent magnet; and
   providing a screen made essentially from a highly conducting material on the surface of said permanent magnets which is adapted to be facing a stator of said electrical machine,
   wherein the screen is applied galvanically.

2. The method of claim 1, wherein said surface of said magnets, before providing said screen, is coated with an electrically conducting film.

3. The method of claim 1, wherein before providing said screen, at each axial end of said poles a ring made essentially from a highly conducting material is fitted.

4. The method of claim 3, wherein each ring is electrically connected to said screen.

5. The method of claim 1, wherein said rotor is adapted to be enclosed by said stator.

6. The method of claim 5, wherein an annular support is fitted on said screen.

7. The method of claim 6, wherein said annular support is made from a fiber reinforced polymer material.

8. The method of claim 6, wherein the annular support is fabricated separately from the remainder of the rotor, and is then slid over the screen and fixed thereto.

9. The method of claim 5, wherein said rotor support comprises an inner rotor support part with a conical outer surface, and an essentially ring-shaped outer rotor support part with a conical inner surface, the conicity of said inner rotor support part and said outer rotor support part being complementary to each other, such that a predetermined radial stress pattern in the rotor is achieved at a predetermined axial position of said inner rotor support part relative to said outer rotor support part.

10. The method of claim 1, wherein each pole comprises an assembly of at least one plate having at least two magnets mounted on said plate, and wherein in a first step said magnets in an unmagnetized state are mounted on said plate, in a second step said magnets mounted on said plate are magnetized to become permanent magnets, and in a third step said assembly of said permanent magnets and said plate is fitted to said rotor support.

11. A permanent magnet rotor for an electrical machine, comprising:
    a rotor support having an axis of rotation;
    at least two poles on said rotor support, each of said poles comprising at least one permanent magnet; and
    a screen made essentially from a highly conducting material on the surface of said permanent magnets which is adapted to be facing a stator of said electrical machine,
    wherein the screen has been applied galvanically.

12. The rotor of claim 11, wherein said surface of said magnets is coated with an electrically conducting film.

13. The rotor of claim 11, wherein at each axial end of said poles a ring made essentially from a highly conducting material is fitted.

14. The rotor of claim 13, wherein each ring is electrically connected to said screen.

15. The rotor of claim 1, wherein said rotor is adapted to be enclosed by said stator.

16. The rotor of claim 15, wherein an annular support is fitted on said screen.

17. The rotor of claim 16, wherein said annular support is made from a fiber reinforced polymer material.

18. The rotor of claim 15, wherein said rotor support comprises an inner rotor support part with a conical outer surface, and an essentially ring-shaped outer rotor support part with a conical inner surface, the conicity of said inner rotor support part and said outer rotor support part being complementary to each other, such that a predetermined radial stress pattern in the rotor is achieved at a predetermined axial position of said inner rotor support part relative to said outer rotor support part.

19. The rotor of claim 11, wherein each pole comprises an assembly of at least one plate having at least two permanent magnets mounted on said plate, said assembly of said permanent magnets and said plate being fitted to said rotor support.

\* \* \* \* \*